United States Patent [19]

Shimizu et al.

[11] Patent Number: 5,167,152
[45] Date of Patent: Dec. 1, 1992

[54] INPUT PROCESSING CIRCUIT FOR AIR FLOW SENSOR

[75] Inventors: Megumu Shimizu; Setsuhiro Shimomura; Yukinobu Nishimura, all of Hyogo, Japan

[73] Assignee: Mitsubishi Denki Kabushiki Kaisha, Tokyo, Japan

[21] Appl. No.: 813,050

[22] Filed: Dec. 23, 1991

Related U.S. Application Data

[63] Continuation of Ser. No. 356,600, May 25, 1989, abandoned, which is a continuation of Ser. No. 147,330, Jan. 22, 1988, abandoned.

[30] Foreign Application Priority Data

Jan. 23, 1987 [JP] Japan ................................. 62-14353
Feb. 2, 1987 [JP] Japan ................................. 62-22680

[51] Int. Cl.$^5$ ............................................. G01F 1/68
[52] U.S. Cl. ................................. 73/204.18; 73/118.2
[58] Field of Search ........... 73/204.18, 204.19, 204.25, 73/204.26, 204.27, 118.2

[56] References Cited

U.S. PATENT DOCUMENTS

| | | | |
|---|---|---|---|
| 3,891,391 | 6/1975 | Boone | 73/204.18 |
| 3,928,800 | 12/1975 | Strenglein | 73 X/204 |
| 4,311,042 | 1/1982 | Hasoya et al. | 73/118.2 |
| 4,391,132 | 7/1983 | Egami et al. | 73 X/204 |
| 4,409,828 | 10/1983 | Kohama et al. | 73/204 |
| 4,412,520 | 1/1983 | Mitsuyasu et al. | 73 X/118.1 |
| 4,532,218 | 8/1985 | Veno | 73/204 |
| 4,581,930 | 4/1986 | Komons | 73/204 |

FOREIGN PATENT DOCUMENTS 61-22217 1/1986 Japan .

Primary Examiner—Herbert Goldstein
Attorney, Agent, or Firm—Rothwell, Figg, Ernst & Kurz

[57] ABSTRACT

An input processing circuit for an air flow sensor comprising a differential amplifier connected through two lines to an air flow sensor and having an operational amplifier an output signal from the air flow sensor and sends a result of this processing to an analogue value - digital value conversion integrated circuit. An output signal from the air flow sensor is supplied to the differential amplifier through a filter circuit so as to prevent an occurrence of error in measuring the amount of sucked air for an internal combustion engine due to various noises. A connection of an inverting input terminal end of the differential amplifier to a ground through a resistor prevents an error caused by a breakage of a reference voltage line connected between the air flow sensor and the input processing circuit. A differential input amplifier circuit also prevents an error caused by a variation in potential resulting from consumption current of an air flow sensor or the like from being generated.

6 Claims, 5 Drawing Sheets

INPUT PROCESSING CIRCUIT FOR AIR FLOW SENSOR

This is a continuation of application Ser. No. 07/356,600, filed May 25, 1989 now abandoned, which is a continuation of application Ser. No. 07/147,330, filed Jan. 22, 1988, now abandoned.

BACKGROUND OF THE INVENTION

1. Field of the Invention

This invention relates to an input processing circuit for an air flow sensor for use in measuring a suction air flow rate of an internal combustion engine, for example, a hot wire type air flow sensor.

2. Description of the Prior Art

A hot wire type air flow sensor is one type of air flow sensor employed for measuring a suction air flow rate of an internal combustion engine. This air flow sensor is constructed such that a voltage corresponding to an air flow rate passing within the sensor is outputted. An input processing circuit for the air flow sensor processes the above-mentioned output voltage to transmit a result of processing operation to an analogue value-digital value converting IC (Integrated Circuit). With this arrangement, a fuel injection device storing the input processing circuit therein judges an air flow rate sucked by an internal combustion engine and injects an amount of fuel corresponding to the air flow rate.

FIG. 1 is a circuit diagram for showing an input processing circuit for a conventional type of air flow sensor. In this figure, a reference numeral 1 designates a hot wire type air flow sensor, and a reference numeral 2 denotes a fuel injection device having an input processing circuit 2c therein.

A reference numeral 1a within the air flow sensor 1 indicates an amplifier, wherein an output voltage $V_{AFS}$ is outputted from an output terminal end of the amplifier 1a to a terminal end (a) of the air flow sensor 1 and a reference voltage $V_A$ is applied to a terminal (b).

The terminal ends (a) and (b) are connected to terminal ends a1 and b1, respectively, of a fuel injection device 2 through lines 3a and 3b, respectively. The terminal a1 is connected to the ground through resistors R1 and R2 and at the same time a connection point between resistors R1 and R2 is connected to a non-inverting input terminal end [(+) input terminal end] of an operational amplifier 2a. The terminal b1 is connected to an inverting input terminal end [(−) input terminal end] of the operational amplifier 2a through resistor R3.

Between an output end of the operational amplifier 2a and the inverting input end is connected a resistor R4. The output end of the operational amplifier 2a is connected to an output terminal 2b.

This input processing circuit 2c is operated such that it may process an output voltage of an air flow sensor 1 and transmit it to an analogue value - digital value conversion IC (not shown). The operational amplifier 2a is a circuit for performing the above-mentioned processing.

Operation of the circuit shown in FIG. 1 will be described. To the terminal end (a) of the hot wire type air flow sensor 1 is outputted a voltage $V_{AFS}$ corresponding to a flow rate of sucked air in an internal combustion engine. That is, the amplifier 1a may output the voltage $V_{AFS}$ in reference to the reference voltage $V_A$.

The input processing circuit 2c stored in the fuel injection device 2 compares a voltage $V_{IN}$ at the terminal a1 as an input voltage with a voltage $V_B$ at the terminal b1 as its reference voltage through the operational amplifier 2a, generates an output voltage $V_O$ in reference to an equation of $$V_O = \frac{R_2 \times (R_3 + R_4)}{R_3 \times (R_1 + R_2)} \times V_{IN} - \frac{R_4}{R_3} \times V_B \quad (1)$$

and then transmits it to the analogue value - digital value conversion IC.

When noises caused by a high voltage application of a spark plug of an internal combustion engine or noises caused by a turning-on or turning-off of a relay in other mounted systems induce voltages between the terminal ends (a) and a1 or terminal ends (b) and b1 shown in FIG. 1, the output voltage $V_O$ of the operational amplifier 2a of the input processing circuit 2c becomes $$V_O = \frac{R_2 \times (R_3 + R_4)}{R_3 \times (R_1 + R_2)} \times (V_{IN} + V_{N1}) - \frac{R_4}{R_3} \times (V_B + V_{N2}) \quad (2)$$

where, a noise level between the terminal ends (a) and a1 is $V_{N1}$ and a noise level between the terminal ends (b) and b1 is $V_{N2}$, and therefore an error voltage $V_{ERR}$ becomes $$V_{ERR} = \frac{R_2 \times (R_3 + R_4)}{R_3 \times (R_1 + R_2)} \times V_{N1} - \frac{R_4}{R_3} \times V_{N2} \quad (3)$$

and so it shows a certain problem to cause such an error as indicated above equation.

FIG. 2 is a circuit diagram for showing an input processing circuit for another conventional type of air flow sensor. In this FIG. 2, a reference numeral 1 designates a hot wire type air flow sensor and a reference numeral 1a denotes an amplifier for generating an output voltage of the air flow sensor.

A reference volta $V_A$ is applied to the amplifier 1a to cause a consumption current $I_1$ for operating its circuit to flow to the ground and further an output voltage $V_{AFS}$ to be outputted.

An input processing circuit 2c is stored in the fuel injection device 2. This input processing circuit 2c mainly consists of an operational amplifier 2a. To a non-inverting input terminal end [(+) input terminal end] of the operational amplifier 2a is applied an output voltage $V_{AFS}$ of the amplifier 1a as a voltage $V_{IN}$.

The operational amplifier 2a may amplify a differential voltage of the voltage $V_{IN}$ in reference to the voltage $V_B$. An inverting input terminal end [(−) input terminal end] of this operational amplifier 2a is connected to the ground through a resistor $R_{12}$ and at the same time a resistor $R_{11}$ is connected between the output terminal end of the operational amplifier and an inverting input terminal end. An output voltage $V_O$ is generated for an output terminal end 2b from the output terminal end of the operational amplifier 2a.

A reference numeral 3 designates a battery for the air flow sensor 1 or the input processing circuit 2c.

Operation of the circuit shown in FIG. 2 will be described. In the hot wire type air flow sensor 1, an output voltage $V_{AFS}$ corresponding to a suction air flow rate of an internal combustion engine is outputted by the amplifier 1a in reference to the reference voltage $V_A$.

In the input processing circuit 2c stored in the fuel injection device 2, the operational amplifier 2a causes a voltage $V_{IN}$ to be applied as an input voltage in reference to the voltage $V_B$ across both ends of a resistor $R_{12}$, generates an output voltage $V_O$ in reference to an equation $$V_O = V_{IN} \times \frac{R_{11} + R_{12}}{R_{12}} \tag{4}$$

and then transmits it to an analogue value - digital value conversion IC.

In the hot wire type air flow sensor 1, a ground potential acting as a reference value of the output voltage $V_{AFS}$ of the amplifier 1a is increased up to a value of $V_1$ by the consumption current $I_1$ for use in operating the circuit.

In turn, also in the input processing circuit 2c, a ground potential of the input processing circuit 2c is increased up to $V_2$ due to a consumption current $I_2$ of the input processing circuit 2c in another circuit in the fuel injection device 2.

Further, since an electric current in a circuit including another installed equipment flows toward the battery 3, a potential $V_{12}$ is also generated between a ground point of the air flow sensor 1 and a ground point of the fuel injection device 2.

Therefore, a voltage to be inputted to the input processing circuit 2c becomes $$V_{IN} = V_{AFS} - [(V_2 + V_{12}) - V_1] \tag{5}$$

in respect to an output voltage $V_{AFS}$ of the amplifier 1a to have an input error of $[(V_2 + V_{12}) - V_1]$. This error is transmitted to an analogue value - digital value conversion IC and further the fuel injection device 2 shows an error of fuel injection volume corresponding to this input error.

SUMMARY OF THE INVENTION

This invention resolves the problems described above and has at its object to provide an input processing circuit for an air flow sensor in which even if noises generated by a high voltage of a spark plug of an internal combustion engine or noises generated by a turning-on or turning-off of a relay for another installed system are induced at an output signal line of the air flow sensor, an output of an operational amplifier in an input processing circuit becomes a value corresponding to an output voltage of the air flow sensor.

It is another object of the present invention to provide an input processing circuit for an air flow sensor in which an output voltage of an air flow sensor can be processed by an input processing circuit and transmitted to an analogue value - digital value conversion IC without being influenced by a circuit consumption current of the air flow sensor or a consumption current of the input processing circuit or a consumption current within a fuel injection device and a potential between each of the ground points.

In order to accomplish the above objects, an input processing circuit for an air flow sensor of the present invention enables an output of the air flow sensor to be processed through a filter circuit.

An input processing circuit for an air flow sensor of the present invention is constructed such that an inverting input terminal end of a differential amplifier constituting the input processing circuit is connected to a ground through a resistor.

Other objects and advantages of the present invention will become more apparent from the following detailed description in reference to the accompanying drawings.

DETAILED DESCRIPTION OF THE PREFERRED EMBODIMENTS

Various preferred embodiments of an input processing circuit for an air flow sensor of the present invention will be described.

Figure 1:
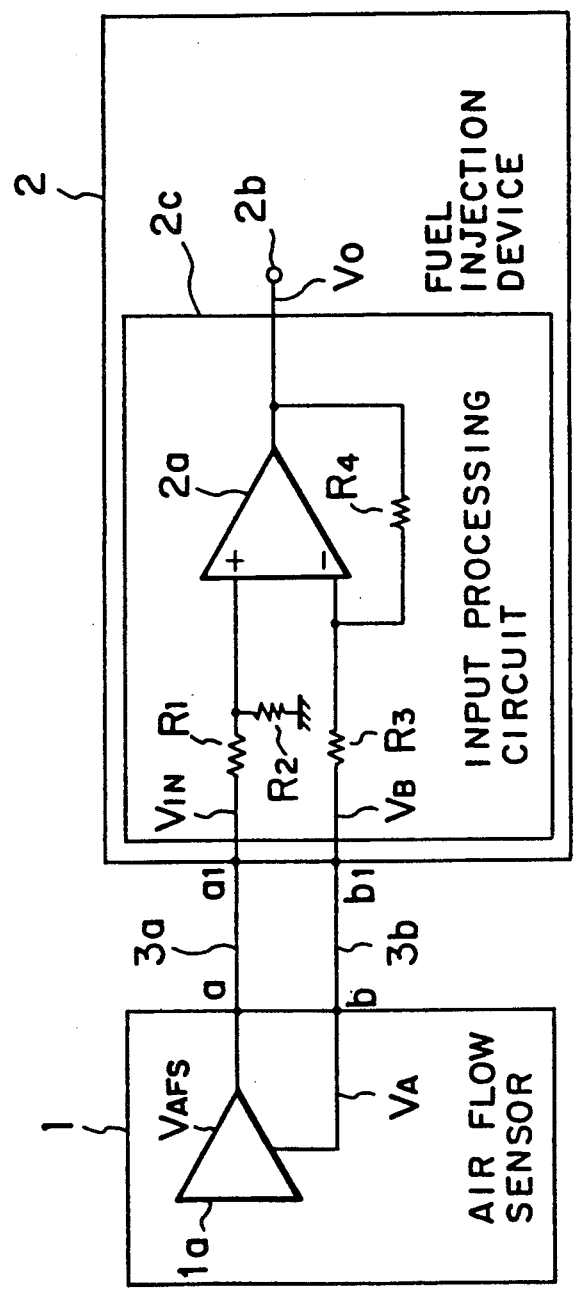
FIGS. 1 and 2 are circuit diagrams for showing an input processing circuits for conventional air flow sensors.
Figure 3:
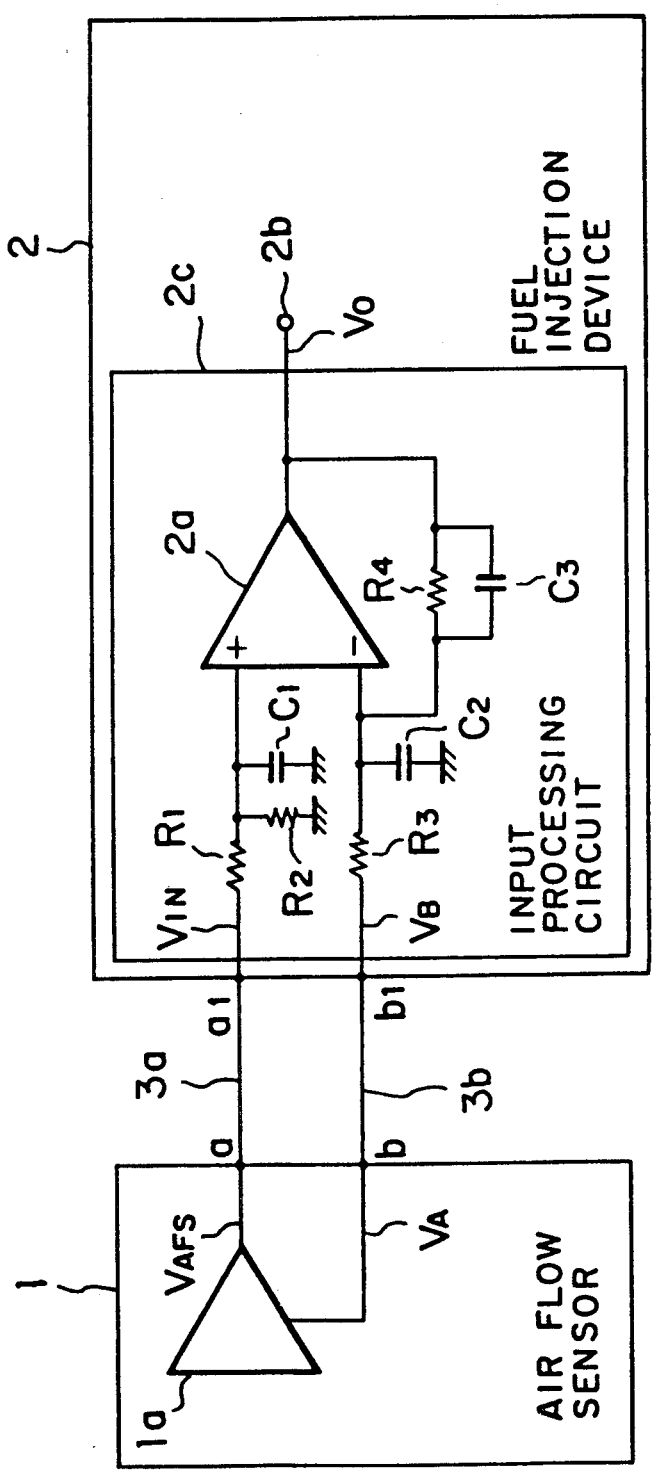
FIG. 3 is a circuit diagram for an input processing circuit for an air flow sensor of one preferred embodiment of the present invention.

FIG. 3 is a circuit diagram for showing a constitution of one preferred embodiment of the present invention. In FIG. 3, the same component elements as those shown in FIG. 1 are referenced with the same reference symbols and a description of the portion of the circuit including such parts is omitted. The description will be mainly directed to parts which are different from those of FIG. 1.

In FIG. 3, capacitors C1 to C3 are newly added to the circuit constitution shown in FIG. 1. That is, a non-inverting input end and an inverting input end of the operational amplifier 2a are connected to the ground through capacitors C1 and C2, respectively, and at the same time a capacitor C3 is connected between an output end and the inverting input end.

The input processing circuit 2c is constructed as a differential input amplifier circuit and shows a function of a primary filter through a constitution of resistors R1 to R4, capacitors C1 to C3 and the operational amplifier 2a.

With such a constitution as above, in FIG. 3, a voltage $V_{AFS}$ corresponding to a suction air flow rate of an internal combustion engine is outputted by the amplifier 1a of an air flow sensor 1 in reference to the reference voltage $V_A$.

In turn, noises caused by a high voltage distribution of a spark plug of an internal combustion engine or noises caused by a turning-on or turning-off of a relay device in another installed system are induced between the terminal ends (a) and a1 or between terminal ends (b) and b1 shown in FIG. 3.

If it is assumed that a noise level induced between the terminal ends (a) and a1 is $V_{Na}$ and a noise level induced between the terminal ends (b) and b1 is $V_{Nb}$ and relations of $R_1 = R_4 = 2R$, $R_2 = R_3 = R$, $C_1 = 3C$, $C_2 = 2C$ and $C_3 = C/2$ are applied, a noise suppression ratio $G_+$ at a non-inverting input terminal end [(+) input terminal end] of the operational amplifier 2a becomes as follows, $$G_+ = \frac{V_{Na}}{V_{IN} - V_B} \times \frac{1}{1 + jwCR} \quad (6)$$

where, $j = \sqrt{-1}$, w is an angular frequency.

Similarly, a noise suppression ratio $G_-$ at an inverting input terminal end [(−) input terminal end] of the operational amplifier 2a becomes as follows, $$G_- = \frac{V_{Nb}}{V_{IN} - V_B} \times \frac{1}{1 + jwCR} \quad (7)$$

and a frequency characteristic of input signals $V_{IN}$, $V_B$ at both input terminal ends of the operational amplifier 2a may constitute a low-pass filter of a cut-off angular frequency (w) in which $$G = \frac{V_O}{V_{IN} - V_B} = \frac{1}{1 + jwCR} \quad (8)$$

is applied in case of $V_{Na} = V_{Nb} = 0$, i.e. a noise is not overlapped to a signal line.

Therefore, if the cut-off angular frequency (w) is set to a sufficient lower value within such a range as one capable of sensing an output voltage during a transient time of the air flow sensor 1 such as an accelerating time or decelerating time of an internal combustion engine, noises caused by a high voltage distribution of a spark plug of an internal combustion engine or noises caused by a turning-on or turning-off of a relay in another installed system are suppressed by a primary filter constituted by the operational amplifier 2a since a frequency component of the noises is sufficiently higher than the cut-off angular frequency (w), and then it is possible to prevent an influence over the output voltage $V_O$.

Figure 4:
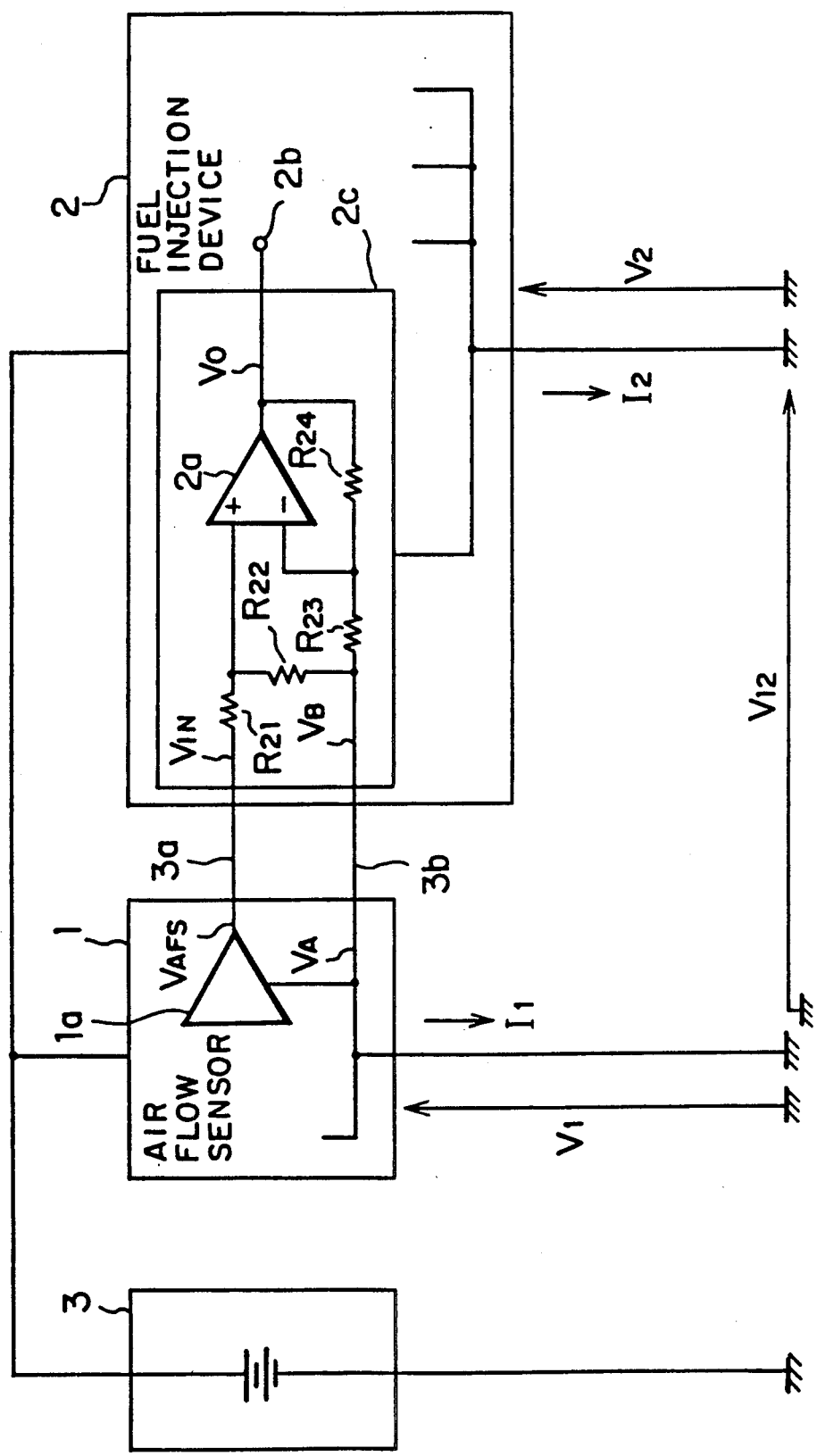
FIG. 4 is a circuit diagram for an input processing circuit for an air flow sensor of another preferred embodiment of the present invention.

FIG. 4 is a circuit diagram showing another preferred embodiment of the present invention. In FIG. 4, the same component elements as those of the conventional circuit shown in FIG. 2 are referenced with the same symbols and a portion different from that shown in FIG. 2 will be mainly described.

Figure 2:
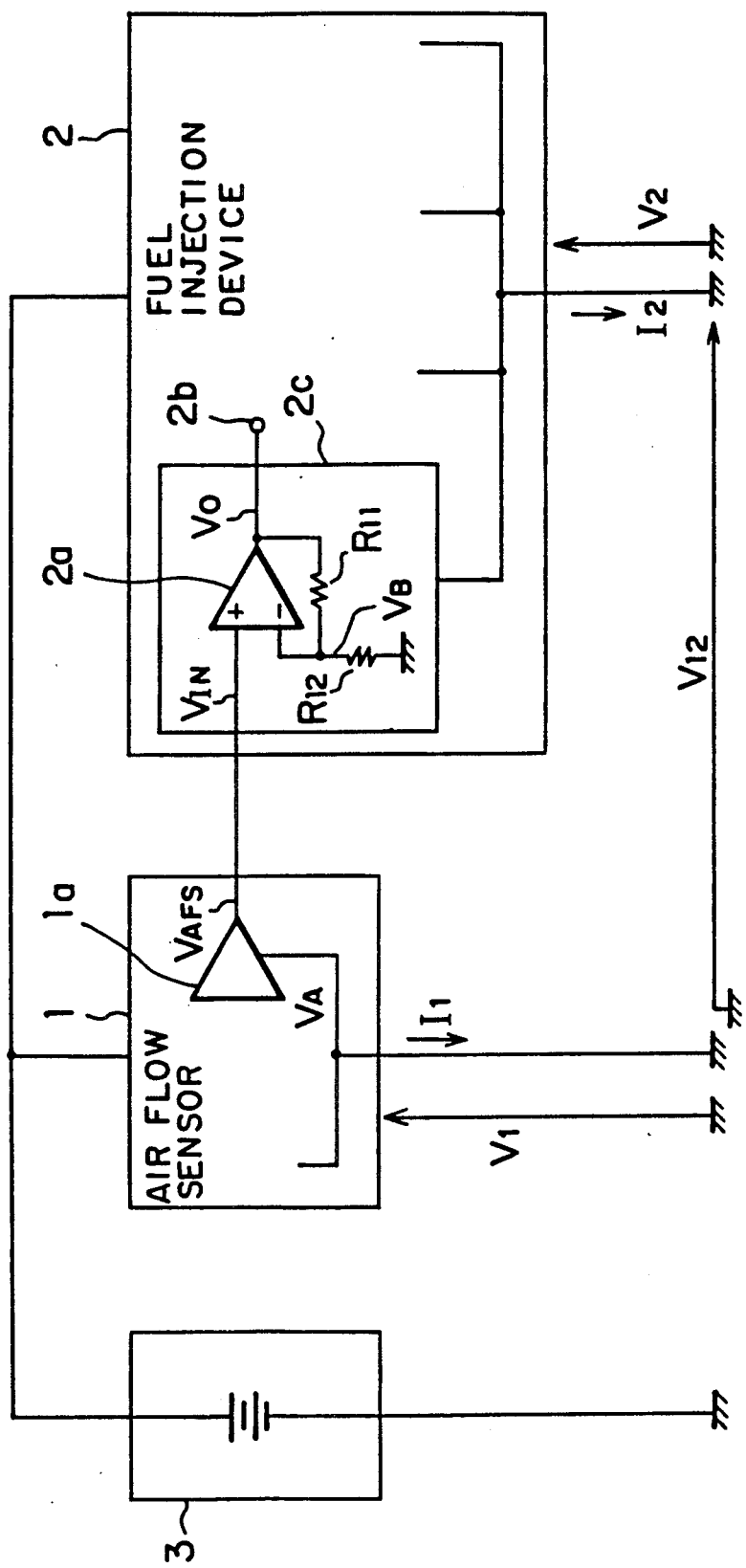

As apparent from a comparison between FIGS. 4 and 2, in FIG. 4 an output voltage $V_{AFS}$ of an amplifier 1a of the air flow sensor 1 is added to a non-inverting input terminal end of the operational amplifier 2a through a line 3a and a resistor $R_{21}$ and at the same time is added to an inverting input terminal end of the operational amplifier 2a through resistors $R_{22}$ and $R_{23}$.

Further, a reference voltage $V_A$ to be added to the amplifier 1a is added to an inverting input terminal end of the operational amplifier 2a through a line 3b and the resistor $R_{23}$ and at the same time is added to a non-inverting input terminal end of the operational amplifier 2a through the resistor $R_{22}$.

Between the output end and the inverting input end of the operational amplifier 2a is connected a resistor $R_{24}$. The remainder of the circuit is the same as that shown in FIG. 2.

Operation of this system will now be described. In FIG. 4, the amplifier 1a outputs an output voltage $V_{AFS}$ corresponding to a flow rate of sucked air of an internal combustion engine in reference to a reference voltage $V_A$. Other features such as an increasing ground potential $V_1$ applied as a reference value of an output voltage $V_{AFS}$ due to a circuit current of air flow sensor 1, an increasing of a ground potential $V_2$ of an input processing circuit 2c due to a consumption current in the input processing circuit 2c or other circuits in the fuel injection device 2 or an occurrence of a differential potential $V_{12}$ between a ground point of the air flow sensor 1 and a ground point of the fuel injection device 2 due to a circuit current of an installed equipment are similar to those found in the example of the conventional system shown in FIG. 2.

However, a reference voltage at a reference point of an output voltage $V_{AFS}$ of the amplifier 1a of the air flow sensor of the present invention is $V_A$, a reference voltage at a reference point of the input processing circuit 2c for the air flow sensor is $V_B$, the reference voltages $V_A$ and $V_B$ are connected by a line 3b and scarcely any electrical current flows between the reference points of the reference voltages $V_A$ and $V_B$, so that the reference voltages $V_A$ and $V_B$ may be assumed as an equivalent potential.

Therefore, the output voltage $V_{AFS}$ of the amplifier 1a of the air flow sensor 1 shows a relation of $V_{AFS} = -V_{IN}$ at the input terminal end of the input processing circuit 2c, and an output voltage $V_O$ of the operational amplifier 2a of the input processing circuit 2c becomes as follows, $$V_O = \frac{R_{22}}{R_{21} + R_{22}} \times \frac{R_{23} + R_{24}}{R_{23}} \times V_{IN} \quad (9)$$

that is, $$V_O = \frac{R_{22}}{R_{21} + R_{22}} \times \frac{R_{23} \times R_{24}}{R_{23}} \times V_{AFS} \quad (10)$$

resulting in that an error is prevented from being generated.

When a circuit line between reference points of references voltages $V_A$ and $V_B$ is broken, the output voltage $V_O$ of the operational amplifier 2a is increased up to a power supply voltage of the operational amplifier 2a, thereby the fuel injection device 2 may not inject fuel having volume corresponding to a flow rate of sucked air for the internal combustion engine.

Figure 5:
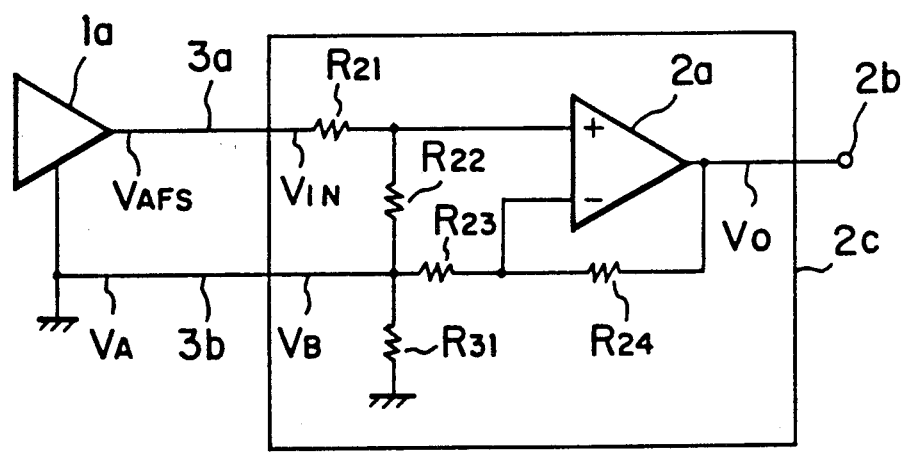
FIG. 5 is a circuit diagram for an input processing circuit for an air flow sensor of a still further preferred embodiment of the present invention.

A resistor $R_{31}$ having a quite low value as compared with resistors $R_{21}$ to $R_{24}$ is connected, as illustrated in another preferred embodiment shown in FIG. 5, between the connecting point of the resistors $R_{22}$ and $R_{23}$ and the ground, thereby the output voltage $V_O$ of the operational amplifier 2a of the input processing circuit 2c becomes a value substantially corresponding to an output voltage $V_{AFS}$ of the amplifier 1a of the air flow sensor 1 even in case of a breakage of the line between the reference points of the reference voltages $V_A$ and $V_B$ and thus an occurrence of error is prevented.

In the above-mentioned preferred embodiments, although a hot wire type air flow sensor is illustrated as the air flow sensor 1, any sensor of a type in which a voltage corresponding to a flow rate of sucked air is outputted, such as a hot film type air flow sensor, can be employed.

As described above, in the present invention, an output of the air flow sensor is processed through a filter circuit, so that even if noises caused by a high voltage distributed in a spark plug of an internal combustion engine or noises caused by a turning-on or turning-off of a relay such as another installed system are induced at a signal line between the air flow sensor and the input processing circuit, a noise level is suppressed by a filter circuit and does not influence an output voltage of the input processing circuit.

The present invention is constructed as a differential input amplifier circuit, and this constitution s already known in the art to show a low gain in respect to an input of a same phase signal component. It is apparent that it is effective when noise signals of same levels are induced in both signal lines.

Furthermore, an input processing circuit of this invention is constructed by a differential amplifier and an inverting input terminal end of this differential amplifier is connected to ground through a resistor so that an output voltage of an amplifier of an air flow sensor is processed by an input processing circuit without being influenced by a variation of a ground potential generated by an electric current in a circuit, transmitted to an analogue value-digital value conversion IC and thus fuel corresponding to a flow rate of sucked air of an internal combustion engine can be injected without any error.

Also, in the embodiment of FIG. 5, an inverting input terminal end of the differential amplifier is connected to a ground through a resistor, in case of a breakage of a circuit line at a reference input signal, this can be processed by an input processing circuit corresponding to an output voltage of an amplifier of an air flow sensor and transmitted to an analogue value - digital value conversion IC, resulting in that fuel corresponding to a flow rate of sucked air of an internal combustion engine can be injected.

The present invention employs a differential input amplifier circuit, and a differential amplifier circuit is well known in the art that it has a low gain in respect to an input of signals with same phases. It is apparent that this system is effective in removing noise signals induced by an ignition noise at both input signal lines due to an installation of the system in a vehicle.

What is claimed is:

1. An input processing circuit for an air flow sensor, the input processing circuit comprising a differential amplifier connected through two lines to an air flow sensor to receive an output signal of the air flow sensor for use in measuring an amount of sucked air in an internal combustion engine, said circuit being characterized by a filter circuit connecting said differential amplifier to the air flow sensor, said filter circuit being constituted by a filter having a first capacitor connected between an inverting input terminal end of said differential amplifier and a ground, a second capacitor connected between a non-inverting input terminal end of said differential amplifier and the ground, and a third capacitor connected between an output terminal end and the inverting input terminal end of said differential amplifier.

2. An input processing circuit for a remote air flow sensor, the input processing circuit comprising first and second input terminal ends, two input lines connecting the first and second input terminal ends of the input processing circuit to respective output terminal ends of the remote air flow sensor to receive an output signal of the air flow sensor for use in measuring an amount of sucked air in an internal combustion engine, said input terminal ends and said input lines at the input terminal ends being isolated from common ground connections with the air flow sensor, an operational amplifier having non-inverting and inverting inputs, first and second resistances connecting the non-inverting and inverting inputs of the amplifier to the respective first and second input terminal ends, a third resistance connecting the non-inverting input of the amplifier to the second input terminal end, and a fourth resistance connecting the second input terminal end to a ground.

3. An input processing circuit for an air flow sensor as set forth in claim 2, wherein said airflow sensor is a hot wire type sensor.

4. An input processing circuit for an air flow sensor as set forth in claim 2, wherein said airflow sensor is a hot film type sensor.

5. An input processing circuit for a remote air flow sensor, the input processing circuit comprising:
   a pair of input terminal ends, two input lines connecting the pair of input terminal ends of the input processing circuit to respective output terminal ends of the remote air flow sensor to transfer an output signal of the air flow sensor for use in measuring an amount of sucked air in an internal combustion engine;
   said input processing circuit having a separate common ground connection from common ground connections of the air flow sensor; and
   an operational amplifier having a pair of inputs coupled to said input terminal ends of said input processing circuit, one of said input terminal ends receiving a voltage signal corresponding to the flow rate of sucked air in an internal combustion engine with respect to a constant reference voltage, and the other of said input terminal ends receiving a voltage signal corresponding to said constant reference voltage;
   further comprising coupling means for coupling said pair of inputs of said operational amplifier to said input terminal ends of said input processing circuit, including a first resistance connecting one of said input terminal ends to a noninverting input terminal of said operational amplifier, a second resistance connecting the other of said input terminal ends to an inverting input terminal of said operational amplifier, and a third resistance connecting said first resistance to said second resistance.

6. An input processing circuit for a remote air flow sensor, the input processing circuit comprising:
   a pair of input terminal ends, two input lines connecting the pair of input terminal ends of the input processing circuit to respective output terminal ends of the remote air flow sensor to transfer an output signal of the air flow sensor for use in measuring an amount of sucked air in an internal combustion engine;
   said input processing circuit having a separate common ground connection from common ground connections of the air flow sensor;
   an operational amplifier having a pair of inputs coupled to said input terminal ends of said input processing circuit, one of said input terminal ends receiving a voltage signal corresponding to the flow rate of sucked air in an internal combustion engine with respect to a reference voltage, and the other of said input terminal ends receiving a voltage signal corresponding to said reference voltage; and
   coupling means for coupling said pair of inputs of said operational amplifier to said input terminal ends of said input processing circuit, including a first resistance connecting one of said input terminal ends to a noninverting input terminal of said operational amplifier, a second resistance connecting the other of said input terminal ends to an inverting input terminal of said operational amplifier, and a third resistance connecting said first resistance to said second resistance.

* * * * *

UNITED STATES PATENT AND TRADEMARK OFFICE
CERTIFICATE OF CORRECTION

PATENT NO. : 5,167,152

DATED : December 1, 1992

INVENTOR(S) : Megumu Shimizu et al.

It is certified that error appears in the above-identified patent and that said Letters Patent is hereby corrected as shown below:

On the cover page, in the Abstract, line 4, after "amplifier" insert --. The input processing circuit processes--.

Column 5, line 1, in equation (6), "$\sqrt{Na}$" should be --$V_{Na}$--;

line 5, "$j=\sqrt{}-1$" should be --$j=\sqrt{-1}$--.

Column 7, line 31, after "and" insert --it-- and delete "a differential amplifier circuit";

line 32, delete "it" and substitute therefor --a differential amplifier circuit--.

Signed and Sealed this

Ninth Day of November, 1993

*Attest:*

BRUCE LEHMAN

*Attesting Officer*      *Commissioner of Patents and Trademarks*